Sept. 6, 1927.
A. E. OSWALD
1,641,548
ELECTRIC MOTOR
Filed April 13, 1925
2 Sheets—Sheet 1
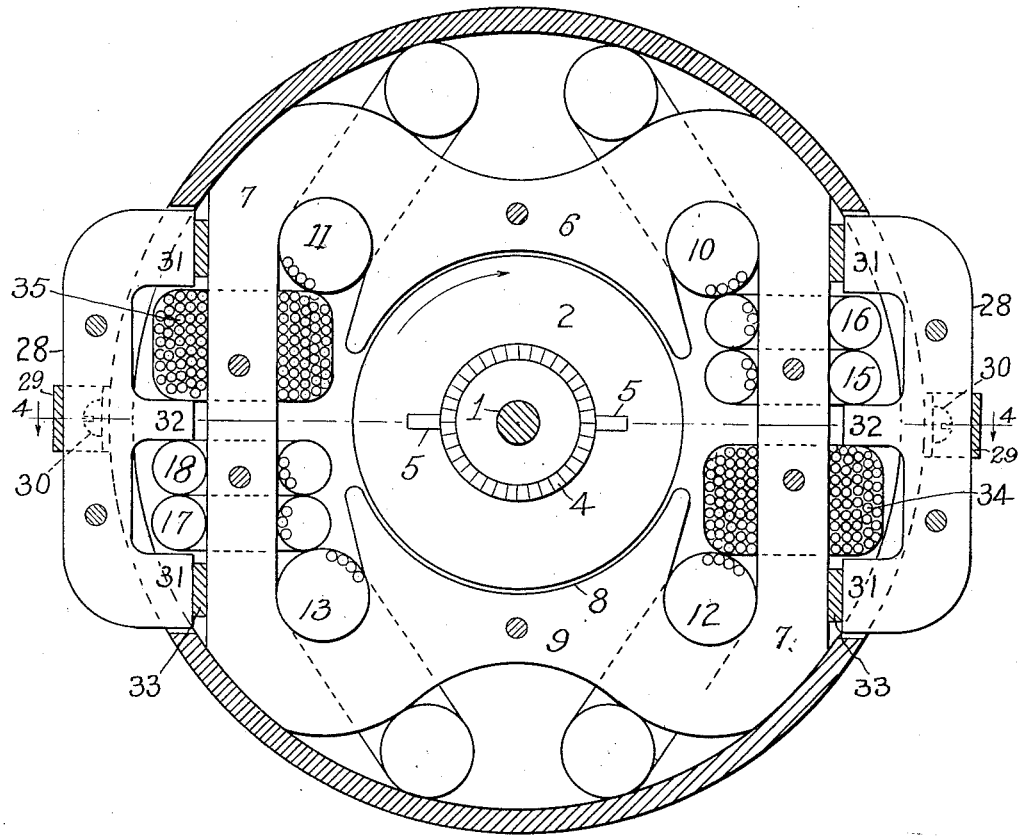
Fig.1.
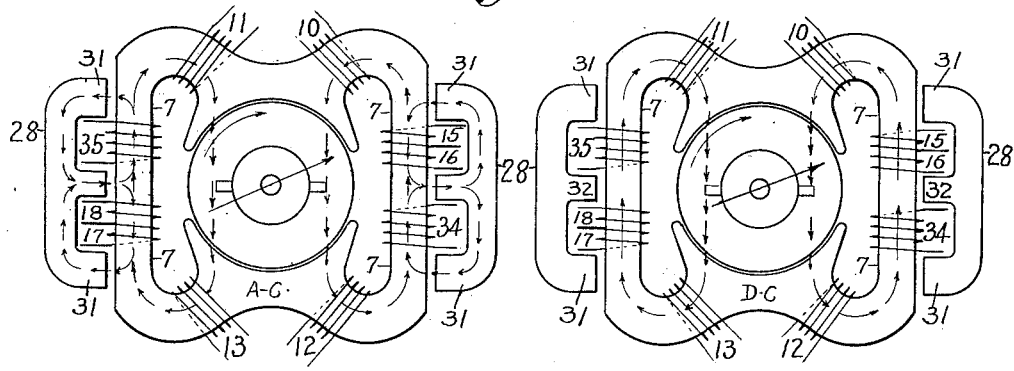
Fig. 2.
Fig. 3.
Inventor.
Alfred E Oswald
by D C Stickney
Attorney.

Sept. 6, 1927. 1,641,548
A. E. OSWALD
ELECTRIC MOTOR
Filed April 13, 1925   2 Sheets-Sheet 2

Inventor.
Alfred E Oswald
by B C Stickney
Attorney.

Patented Sept. 6, 1927.

1,641,548

UNITED STATES PATENT OFFICE.

ALFRED E. OSWALD, OF HACKENSACK, NEW JERSEY, ASSIGNOR TO UNDERWOOD TYPEWRITER COMPANY, OF NEW YORK, N. Y., A CORPORATION OF DELAWARE.

ELECTRIC MOTOR.

Application filed April 13, 1925. Serial No. 22,664.

My invention relates to alternating current motors generally, but particularly to the convertible type of motor designed to operate at substantially constant speed whether supplied with alternating or direct current. More specifically stated, my invention relates to certain improvements in the construction and mode of operation of the convertible motor claimed in my application Serial No. 427,346, filed November 30, 1920 (now Patent No. 1,554,647, dated September 22, 1925). While I have disclosed my present invention herein as applied to my said convertible motor as one of the modes in which I have applied the principle of my present invention to motors operated either by direct or alternating current, it is understood, of course, that I do not desire to confine my present invention to said particular convertible motor or type of motor, but to secure my present invention as well when it is applied to any other particular motor or type of motor to which it may be found to be applicable.

In my convertible motor disclosed in my said application, I employ a motor with its field coils connected in shunt, preferably directly across the voltage supply mains, and certain other coils, termed auxiliary coils in my said application, and connected in series with the armature. The field and auxiliary coils are bunched, respectively, and linked on an endless magnet core; the field coils being wound on the pole pieces, as is usual, and the auxiliary coils wound on said core or yoke midway between said pole pieces. In connection with the coils and endless magnet core, I employ in the invention disclosed in said application two iron keepers, each keeper having two legs, one at each end of the keeper. In my said application I showed a bi-polar motor, and the keepers placed opposite each other outside of the endless core at about midway between the pole pieces of said core. The keepers are adjustable towards and from the endless core, whereby variable air gaps between the legs and core are obtained, or which gaps may be occupied with some other kind of magnetic impediment, such, for example, as wooden spacers. By the arrangement of an endless core and keepers each having a leg at each of its ends, four magnetic circuits in effect are provided, the paths of two of the circuits being from the north pole piece through the armature to the south pole piece and from thence along the endless core to the north pole piece, and the paths of the other two circuits beginning at the core and branching off therefrom after leaving the south pole piece and passing through two of the magnetic impediments to two of the legs of the keepers nearest the south pole piece, and thence along the yoke of the keepers to the other legs, and from them through the other magnetic impediments to and along the endless core back to the north pole piece.

Among the main objects of my present invention is to employ additional auxiliary coils and three legs on the keepers, the additional legs being placed about midway between the legs at each end of the keepers. The additional auxiliary coils act as resistance coils when the motor is operating on direct current, their function in that respect being similar to the auxiliary coils employed in my invention disclosed in my said application. But when the motor is operating on alternating current the additional auxiliary coils act as a primary of a transformer connected across the voltage supply mains, being in that respect unlike the auxiliary coils as disclosed in my invention in my said application. The object in providing the third leg or three legs altogether on each keeper is to obtain a larger number of magnetic circuits than is obtained in the invention disclosed in my said application, the larger number of magnetic circuits being through the third leg of the keepers. The purpose of the circuits is, broadly stated, to co-operate with the additional auxiliary coils when they act as a primary of a transformer.

Of all of the aforestated changes and improvements and others not mentioned thus far will more fully appear hereinafter.

I attain these objects by the invention herein described and illustrated in the accompanying drawings, in which Figure 1 is a general construction or assembly view of the motor.

Figure 2 is a view of the motor, indicating the direction of the magnetic field or circuits, when it is operating on alternating current.

Figure 3 is a view of the motor, and indicating the magnetic circuits, the arrows indicating the direction of flow of the magnetic flux when it is operating on direct current.

Figure 6:
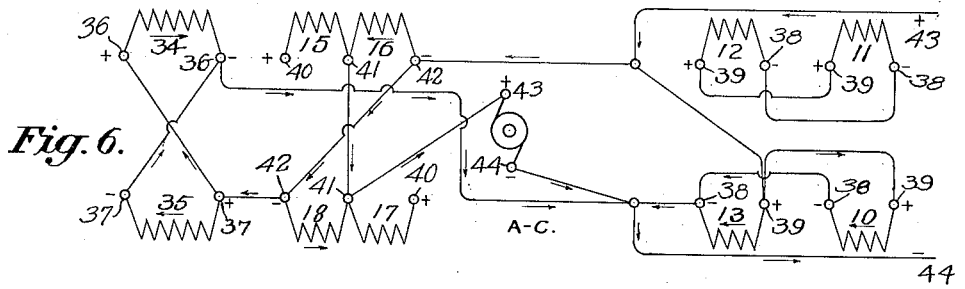
Figure 6 is a diagram indicating the motor as operating on alternating current and the connections of the field and auxiliary coils, the additional auxiliary coils connected to each other in parallel, and acting as a primary of a transformer connected straight across the supply circuit, the arrows pointing in the direction of the current.

Referring to the drawings, they show a motor shaft 1, an armature 2, a cooling fan 3, a commutator 4 mounted on the shaft and commutator brushes 5, and an electro-magnet structure consisting of an endless magnet core 6 surrounding the armature, and comprised of straight yoke portions 7, the pole pieces 8 joined to the straight portions 7 by curved neck portions or bends 9. On the bends are wound or bunched field coils 10, 11, 12 and 13, which are mounted in pairs at the poles, at a converging angle towards each other outwardly, the coils at the converging portions lying back of the pole horns 14, at the ends of the pole pieces. On the straight portions 7 of the endless core are auxiliary coils 15, 16, 17 and 18 bunched in two pairs, one pair 15 and 16 mounted on the upper end of one of the straight portions of the core at the right hand looking at Figures 1, 2 and 3 of the drawings, and the other pair 17 and 18 mounted on the lower end of the other straight portion of the core at the left hand looking at said figures. The two pairs are shown as lying with the inward portion of their ring near the field coils. In my said application the coils therein corresponding to the coils 15, 16, 17 and 18 herein are called auxiliary coils, and that name for coils 15, 16, 17 and 18 is adopted herein, except where they are referred to hereinafter as the original auxiliary coils.

Figure 4:
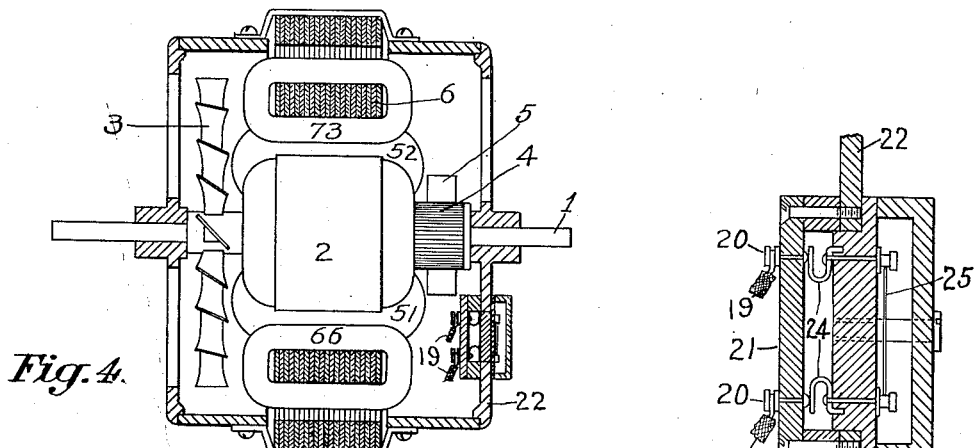
Figure 4 is a view of the motor and convertible means therefor, partly in full lines, and partly in sectional lines.
Figure 5:
Figure 5 is a cross-sectional view of the convertible means for the motor.
Figure 8:
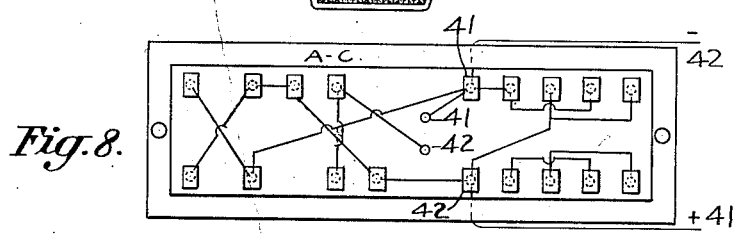
Figure 8 is an inverted view of the convertible means for the motor when it is operating on alternating current, said means producing the connections diagrammed in Figure 6.
Figure 9:
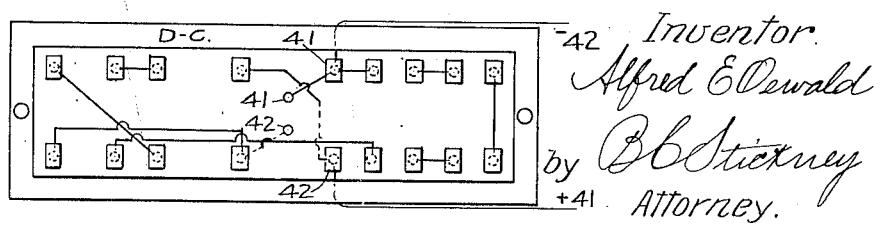
Figure 9 is an inverted view of the convertible means for the motor when it is operating on direct current, said means producing the connections diagrammed in Figure 7.

In my present invention I bring the terminals 19 of the armature winding and various coils spoken of above out to terminal posts 20, mounted on a plate 21 fastened to the casing 22 of the motor. Opposite to the plate is an opening in the motor casing designed to receive therein another plate 23 on which is mounted a series of contacts 24 connected together by conductors 25. When plate 23 is in place in the opening in the motor casing designed to receive it, the contacts 24 on the plate 23 are in contact with the terminal posts 20 of the terminals 19 of the various windings above referred to. The arrangement of the terminals, contacts and conductors is such that when the motor is to be operated on direct current the plate 23, suitable for operation of the motor on direct current, is selected and fitted in the opening in the motor casing to receive and hold it therein; when the motor is to be operated on alternating current the plate 23, suitable for operation of the motor on alternating current, is selected and fitted in the same opening in the motor casing to receive it likewise. Thus it will be reflected that the motor can be converted for operation on either direct or alternating current by applying the proper plate converting as desired the motor for operation on the particular kind of current in question. In Figures 4 and 5 the opening in the motor casing to receive the exchangeable plates is indicated. On the outside of the straight portions 7 of the endless core there are placed two iron keepers 28 supported by framework 29, and adjustable by means of screws 30 towards and from the endless core. The keepers have three legs, one, 31, at either end and the other, 32, midway between the end legs. The keepers are shown in Figures 2 and 3 with air-gaps between the endless core and the legs, and in Figure 1 with the air-gap between the middle legs and the endless core unfilled, but the air-gaps between the end legs and the core as occupied by a non-magnetic material 33, such as wood, for example.

Also on the two straight portions 7 of the endless core, there are bunched two additional auxiliary coils 34 and 35; one coil, 34, is placed on one of the portions beneath original auxiliary coil 15, and between the middle leg 32 and the lower end leg 31 of the keepers 28, looking at Figures 1, 2 and 3 of the drawings; and on the other straight portion 7 of the core the other additional auxiliary coil 35 is placed between the middle leg 32 and the upper end leg 31, looking at said figures. As has been stated, the terminals 19 are brought out to the terminal posts 20 on the plate 21 fixed on the motor casing; but for the sake of clearness of description and illustration, the terminal of the additional auxiliary coil 34 is indicated by the reference numeral 36, and the terminal of the other additional auxiliary coil 35 is indicated by the numeral 37 on the plate 21. The terminals of the field coils are designated by the numerals 38 and 39, see Figures 6 and 7; the terminals of the original auxiliary coils are indicated by the numerals 40, 41 and 42. The terminal for the plus lead of the voltage supply mains is indicated by the reference numeral 43 and the minus lead by numeral 44.

Referring to the magnetic circuits, when the motor is operating on direct current, the magnetic circuit is through the two poles of the main magnet structure, the armature of the motor, and the straight portions 7 of the endless core, as indicated by the direction of the arrows in Figure 3; but when the motor is operated on alternating current additional magnetic circuits are set up, as indicated by the arrows in Figure 2; two of the circuits are through the armature and endless core; and two other circuits through the middle legs of the keepers and straight portions 7 of the endless core.

Figure 7:
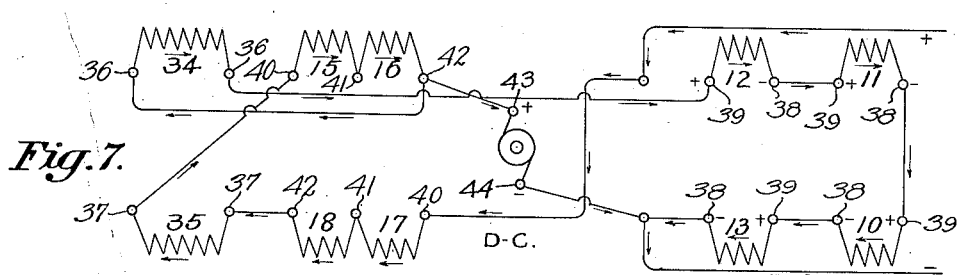
Figure 7 is a diagram indicating the motor as operating on direct current and the connections of the field and auxiliary coils, and an auxiliary coil in series with the field coils acting as resistance, and an auxiliary coil in series with the armature acting as resistance.

Having reference to the connection of the coils, when the motor is operating on direct current all four field coils are connected in series with the additional auxiliary coil 34 and in parallel with the armature, as shown in Figure 7. When the motor is operating on alternating current, only two of the field coils 10 and 13 are connected across the voltage supply mains; the other two field coils 11 and 12 are not connected at that time to the voltage supply mains, but are connected to each other in parallel, and act as equalizers or balancers of the two halves of the main magnetic circuit. When the motor is operating on either direct or alternating current, the original auxiliary coils are always connected in series with the armature; but their connection in the armature circuit when the motor is operating on alternating current is the reverse from what their connection was when the motor operated on direct current, as indicated in Figures 6 and 7.

When the motor is operated on direct current, only one of the additional auxiliary coils, 35, is connected in series with the armature, the other additional auxiliary coil, 34, being connected in series with the field coils at that time, and both additional auxiliary coils act at that time as resistance, see Figure 7. When the motor is operating on alternating current, the additional auxiliary coils are connected in parallel, and act at that time as a primary of a transformer connected straight across the voltage supply mains. Two of the field coils, 11 and 12, are not connected to the voltage supply mains at that time, but are connected in parallel with each other, and act as equalizers or balancers to the halves of the main magnetic circuit, not being connected at that time to the main supply circuit, as has been already stated. The two field coils, 11 and 12, act as secondaries of a transformer, and are connected in parallel with each other so as to oppose each other, and thereby form a balance between the two halves of the main magnetic circuit. The middle leg on the keepers is used because of the adoption of the additional auxiliary coils, and so that each of said coils can be used and connected directly across the alternating current voltage supply mains, and each of said coils has virtually a magnetic circuit of its own when acting as a primary of a transformer, the number of turns of wire on each additional auxiliary coil being about one-half of the number of turns in each of the field coils.

As the coils and their terminals and the contacts and conductors connecting the contacts and the electric circuits are so simple and plainly described in the specification and shown in the drawings, see particularly Figures 6 and 7, it is not believed to be necessary to add to the length of the description by tracing in words the electric circuits, and as the description has already traced in words the paths of the magnetic circuits, and indicated them by pointing of arrows on the drawings, see particularly Figures 2 and 3, it is not thought to be necessary to retrace in words the paths of the magnetic circuits.

Variations may be resorted to within the scope of the invention, and portions of the improvements may be used without others.

Having thus described my invention, I claim:

1. A convertible motor comprising a combination of the armature and its winding, field coils in shunt with the armature, sets of other coils, one set in series with the armature winding, and the other set in parallel with the armature and in series with the field coils, a field magnet structure, the field coils wound on the cores adjacent to the pole pieces of said structure, and said other coils also wound on portions of said cores between the field coils, and iron keepers supported opposite to said portions, each keeper having three legs, one leg between the other two, astride of said other coils, and the middle legs extended between said other coils.

2. A convertible motor comprising a combination of the armature and its winding, sets of field coils, one set in shunt with the armature and connected to the voltage supply mains, and the coils of the other set connected in parallel with each other and constituting a closed circuit, sets of other coils, the coils of one set connected in series with the armature and in parallel with each other, and the coils of the other set connected in shunt with the armature and in parallel with each other, a field magnet structure, said field coils wound on the cores adjacent to the pole pieces, and said other coils wound on other portions of the cores and between said field coils, and iron keepers opposite said other portions, each keeper having three legs, one leg between the other two, astride of said other coils, and the middle legs extended between said other coils.

3. A convertible motor comprising a combination of the armature and its winding, sets of field coils, one set in shunt with the armature and connected to the voltage supply mains, and the coils of the other set connected in parallel with each other and constituting a closed circuit, sets of auxiliary and additional auxiliary coils, the coils of one set of auxiliary coils connected in series with the armature and in parallel with each other, and the coils of the set of additional auxiliary coils connected in shunt with the armature and in parallel with each other, a field magnet structure, said field coils wound on the cores adjacent to the pole pieces, the auxiliary coils wound on other portions of the cores and between the field coils, one set of said auxiliary coils being adjacent to the north pole piece and the other set of said auxiliary coils being adjacent to the south pole piece, and the additional auxiliary coils also wound on still other portions of the cores and between the field coils, one set of the additional auxiliary coils being adjacent to the north pole piece and the other set of the additional auxiliary coils being adjacent to the south pole piece, and iron tri-ped keepers supported opposite the portions of the cores on which the auxiliary and additional auxiliary coils are wound, with the legs astride of said auxiliary and additional coils, and with the middle legs extended between the auxiliary and additional coils.

4. A convertible motor comprising a combination of the armature, field coils connected directly across the voltage supply mains, sets of auxiliary coils, one set of the auxiliary coils connected in series with the armature, and the other set of auxiliary coils connected in series with the field coils and in parallel with the armature, a field magnet structure, the field coils bunched on the magnet core adjacent to the pole pieces of the magnet structure, and the auxiliary coils bunched on portions of the magnet core between the sets of field coils, and iron keepers supported opposite to the auxiliary coils, each keeper having three legs, one leg between the other two legs, astride of the auxiliary coils, and the middle legs extended between the auxiliary coils.

5. A convertible motor comprising a combination of the armature, pairs of field coils, one pair connected directly across the voltage supply mains, the other pair connected in parallel with each other and constituting a closed circuit, pairs of auxiliary coils, the coils of one of the pairs of auxiliary coils connected in series with the armature and in parallel with each other, and the coils of the other pair connected directly across the supply lines and in parallel with each other, a field magnet structure, said field coils bunched on the magnet core adjacent to the pole pieces, and the auxiliary coils bunched on the core and between the field coils, and iron keepers supported opposite the auxiliary coils, each keeper having three legs, one leg between the other two legs, astride of the auxiliary coils, and the middle leg extended between the auxiliary coils.

6. A convertible motor comprising a combination of the armature, pairs of field coils, one pair connected directly across the voltage supply mains, the other pair connected in parallel with each other and constituting a closed circuit, pairs of auxiliary coils, and pairs of additional auxiliary coils, one pair of the auxiliary coils connected in series with the armature and the coils of the pair connected in parallel with each other, and the pair of additional auxiliary coils connected directly across the voltage supply mains, and the coils of said pair in parallel with each other, a field magnet structure, the field coils bunched on the core adjacent the pole pieces, the auxiliary coils bunched on other portions of the core and between the field coils, one pair of the auxiliary coils being adjacent the pole piece of one and the same polarity and to one of the pairs of the additional auxiliary coils, and the other pair of auxiliary coils being adjacent the pole piece of opposite polarity and the other pair of additional auxiliary coils, and said additional coils bunched on still other portions of the core and between the field coils, one pair of the additional auxiliary coils being adjacent the pole piece of one and the same polarity, and the other pair of the additional auxiliary coils being adjacent the pole piece of said opposite polarity, and iron keepers supported opposite the portions of the core on which the auxiliary coils and the additional auxiliary coils are wound, with three legs astride of the auxiliary coils and the additional auxiliary coils and with the middle legs extended between the auxiliary coils and the addition auxiliary coils.

ALFRED E. OSWALD.